(12) United States Patent  
Anantha et al.

(10) Patent No.: US 9,031,560 B2  
(45) Date of Patent: May 12, 2015

(54) CONDITION REPORTING TO ENABLE POSSIBLE REDUCTION IN RADIO NETWORK INEFFICIENCIES

(71) Applicant: Nokia Siemens Networks Oy, Espoo (FI)

(72) Inventors: Swaminathan Anantha, Round Lake, IL (US); John M. Harris, Glenview, IL (US); Sean Kelley, Hoffman Estates, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 196 days.

(21) Appl. No.: 13/622,421

(22) Filed: Sep. 19, 2012

(65) Prior Publication Data

US 2013/0072193 A1 Mar. 21, 2013

Related U.S. Application Data

(60) Provisional application No. 61/536,187, filed on Sep. 19, 2011.

(51) Int. Cl.
| | | |
|---|---|---|
| *H04W 36/00* | (2009.01) | |
| *H04B 15/00* | (2006.01) | |
| *H04W 36/04* | (2009.01) | |
| *H04W 84/04* | (2009.01) | |

(52) U.S. Cl.
CPC .......... *H04W 36/0055* (2013.01); *H04W 36/04* (2013.01); *H04W 84/045* (2013.01)

(58) Field of Classification Search
CPC .............................. H04W 76/02; H04W 48/06

USPC .......................................................... 455/436
See application file for complete search history.

(56) References Cited

U.S. PATENT DOCUMENTS

| | | | | |
|---|---|---|---|---|
| 2009/0258650 A1* | 10/2009 | Lee et al. | | 455/437 |
| 2011/0183672 A1* | 7/2011 | Jeong et al. | | 455/436 |
| 2011/0300807 A1* | 12/2011 | Kwun et al. | | 455/63.1 |
| 2013/0090118 A1* | 4/2013 | Jung et al. | | 455/436 |

FOREIGN PATENT DOCUMENTS

| | | |
|---|---|---|
| WO | WO-2008020280 A1 | 2/2008 |
| WO | WO-2008113373 A1 | 9/2008 |
| WO | WO-2011017934 A1 | 2/2011 |

OTHER PUBLICATIONS

3GPP TSG RAN WG2#70bis, "Mobility suport to pico cells in hte co-channel HetNet deployment", Jul. 2010.*

* cited by examiner

*Primary Examiner* — Timothy Pham  
(74) *Attorney, Agent, or Firm* — Harrington & Smith

(57) ABSTRACT

A method includes sending a message from a first base station to another entity in a radio network. The message includes one or more indications one or more conditions have been met. The one or more conditions include one or both of: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time. The entity may receive the message, e.g., and use the message to determine whether to effect changes to the radio network. Apparatus, program products, and software are also disclosed.

24 Claims, 11 Drawing Sheets

709

1) A DURATION THAT THE USER EQUIPMENT IS CONNECTED TO CELL B IS LESS THAN A THRESHOLD;

2) SIGNAL STRENGTH, AS MEASURED BY THE USER EQUIPMENT AND REPORTED TO CELL B's BASE STATION, OF CELL C IS BETTER THAN A SIGNAL STRENGTH OF CELL B FOR A THRESHOLD DURATION OF TIME;

3) AN AMOUNT OF DATA EXCHANGED BY CELL B's BASE STATION WITH THE USER EQUIPMENT IS GREATER THAN A FIRST THRESHOLD;

4) AN AMOUNT OF DATA EXCHANGED PER SECOND BY CELL B's BASE STATION WITH THE USER EQUIPMENT IS GREATER THAN A SECOND THRESHOLD;

5) A VELOCITY OF THE UE IS LESS THAN A THRESHOLD VELOCITY;

6) CELL C IS A NEIGHBOR OF CELL A;

7) CELL C IS IN AN OUTBOUND HANDOVER LIST;

8) CELL A IS IN AN INBOUND HANDOVER LIST;

9) A CELL TYPE ASSOCIATED WITH CELL C MEETS A PREDETERMINED CELL TYPE;

10) A CELL TYPE ASSOCIATED WITH CELL B MEETS A PREDETERMINED CELL TYPE;

11) A CELL TYPE ASSOCIATED WITH CELL C IS A SAME AS A CELL TYPE OF CELL A;

12) A CELL TYPE ASSOCIATED WITH CELL C IS THE SAME AS A CELL TYPE OF CELL A AND THE CELL TYPE OF CELL B IS OF A DIFFERENT CELL TYPE THAN THE CELL TYPE OF CELLS A AND C; OR

13) CELLS A AND C ARE CONTROLLED BY A SAME BASE STATION CONTROLLER WHICH IS DIFFERENT THAN THE BASE STATION CONTROLLER CONTROLLING THE FIRST CELL

1) A DURATION;
2) A THRESHOLD DURATION OF TIME, AND MEASUREMENT REPORT CRITERIA (e.g., A dB THRESHOLD INDICATING HOW MUCH CELL C IS STRONGER THAN CELL B, OR AN ABSOLUTE dB THRESHOLD ASSOCIATED WITH STRENGTH OF CELL C);
3) A FIRST THRESHOLD;
4) THE SECOND THRESHOLD;
5) THE THRESHOLD VELOCITY;
6) NEIGHBOR INFORMATION FOR CELLS A AND C;
7) THE OUTBOUND HANDOVER LIST;
8) THE INBOUND HANDOVER LIST;
9) THE CELL TYPE ASSOCIATED WITH CELL C;
10) THE CELL TYPE ASSOCIATED WITH CELL B;
11) THE CELL TYPES ASSOCIATED WITH CELLS A AND C;
12) THE CELL TYPES ASSOCIATED WITH CELLS A, B, AND C; OR
13) A LIST OF WHICH BASE STATION CONTROLLERS CONTROL WHICH CELLS FOR AT LEAST CELLS A, B, AND C

1) INDICATION THAT A DURATION THAT THE USER EQUIPMENT IS CONNECTED TO CELL B IS LESS THAN A THRESHOLD (e.g., AND DURATION);

2) INDICATION THAT SIGNAL STRENGTH AS MEASURED BY THE USER EQUIPMENT AND REPORTED TO THE CELL B's BASE STATION OF CELL C IS BETTER THAN A SIGNAL STRENGTH OF THE CELL B FOR A THRESHOLD DURATION OF TIME;

3) INDICATION THAT AN AMOUNT OF DATA EXCHANGED BY CELL B's BASE STATION WITH THE USER EQUIPMENT IS GREATER THAN A FIRST THRESHOLD;

4) INDICATION THAT AN AMOUNT OF DATA EXCHANGED PER SECOND BY CELL B's BASE STATION WITH THE USER EQUIPMENT IS GREATER THAN A SECOND THRESHOLD;

5) INDICATION THAT A VELOCITY OF THE UE IS LESS THAN A THRESHOLD VELOCITY;

6) INDICATION THAT CELL C IS A NEIGHBOR OF CELL A;

7) INDICATION THAT CELL C IS IN AN OUTBOUND HANDOVER LIST;

8) INDICATION THAT CELL A IS IN AN INBOUND HANDOVER LIST;

9) INDICATION THAT A CELL TYPE ASSOCIATED WITH CELL C MEETS A PREDETERMINED CELL TYPE;

10) INDICATION THAT A CELL TYPE ASSOCIATED WITH CELL B MEETS A PREDETERMINED CELL TYPE;

11) INDICATION THAT A CELL TYPE ASSOCIATED WITH CELL C IS A SAME AS A CELL TYPE OF CELL A;

12) INDICATION THAT A CELL TYPE ASSOCIATED WITH CELL C IS THE SAME AS A CELL TYPE OF CELL A AND THE CELL TYPE OF CELL B IS OF A DIFFERENT CELL TYPE THAN THE CELL TYPE OF CELLS A AND C;

13) INDICATION THAT CELLS A AND C ARE CONTROLLED BY A SAME BASE STATION CONTROLLER WHICH IS DIFFERENT THAN THE BASE STATION CONTROLLER CONTROLLING CELL B; OR

14) CELL TYPES OR CELL IDENTITIES APPROPRIATE FOR 1–13

FIG.10

CONDITION REPORTING TO ENABLE POSSIBLE REDUCTION IN RADIO NETWORK INEFFICIENCIES

CROSS-REFERENCE TO RELATED APPLICATIONS

The present application claims the benefit under 35 U.S.C. §119(e) of U.S. Provisional Patent Application No. 61/536,187, filed on Sep. 19, 2011, the disclosure of which is hereby incorporated by reference in its entirety.

TECHNICAL FIELD

This invention relates generally to wireless networks and, more specifically, relates to handover in radio networks.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Wireless traffic volumes are dramatically outstripping macro cellular capability. Having multiple smaller cell coverage areas (called zone eNB access points or remote radio units, home eNBs, femto cells, pico cells, remote radio heads, or additional names) controlled by a single controller (which might be called zone eNB controller, central control unit, home eNB Gateway, eNB gateway, or additional names) is anticipated to be a potential solution to this problem. For instance, a macro cell might provide coverage over a larger area, where there are multiple smaller cells under this larger coverage area. The smaller cells might be controlled by a single controller. Such a configuration may be referred to as a heterogeneous network (HetNet). In this manner, users within the smaller cells share data resources amongst a smaller set of users and typically the HetNet configuration can provide higher capacity and a faster network overall.

However, since there are smaller cells at least partly within a macro cell, the chance exists that there will be multiple handovers between the smaller cells, or between the smaller cells and the macro cell. These handovers may not be efficient.

In another example, cells having overlapping coverage areas may be operated by different service providers or use different radio access technologies. One might say that the cells can be connected under different portions of the radio network. Also, the chance exists that there will be multiple handovers between cells belonging to different service providers and/or using different radio access technologies.

SUMMARY

This section contains examples of possible implementations and is not meant to be limiting.

In one exemplary embodiment, a method includes sending a message from a first base station to another entity in a radio network, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time.

A further exemplary embodiment is a method including the method of the previous paragraph, wherein the message is only sent if the one or more conditions have been met. An additional exemplary embodiment is the method of this paragraph and/or the previous paragraph, wherein the user equipment is handed into the first base station from a third base station, and wherein the other entity includes the third base station. A further exemplary embodiment is a method including the method(s) of this paragraph and/or the previous paragraph, wherein the condition of the signal strength further includes the condition of the signal strength of the second cell as measured by the user equipment and reported to the first base station is better according to at least one criterion than the signal strength of the first cell for the threshold duration of time. In yet another exemplary embodiment, a method includes any of the methods of this paragraph and/or the previous paragraph, and further includes the first base station determining whether the one or more conditions have been met and sending the message in response to a determination the one or more conditions have been met. Another exemplary embodiment includes a method of any one of the methods in this and/or a previous paragraph, wherein the user equipment is handed into the first base station from a third base station serving a third cell, and wherein the one or more conditions further include one or more of the following: a velocity of the user equipment is less than a threshold velocity; the second cell is a neighbor of the third cell; the second cell is in an outbound handover list; the third cell is in an inbound handover list; a cell type associated with the second cell; a cell type associated with the first cell; a cell type associated with the second cell is a same as the cell type of the third cell; the cell type associated with the second cell is the same as the cell type of the third cell and the cell type of the first cell is of a different cell type than the cell type of the second and third cells; or the second and third cells are controlled by a same base station controller which is different than the base station controller controlling the first cell. Another exemplary embodiment is a method of any one of this and/or the preceding paragraph, wherein the one or more conditions further include an amount of data exchanged by the first base station with the user equipment is greater than a second threshold. A further exemplary embodiment includes a method of this and/or the previous paragraph, wherein the one or more conditions further include an amount of data exchanged per second by the first base station with the user equipment is greater than a third threshold. Yet another example is a method of any of the methods of this paragraph and/or the previous paragraph, further including aggregating a plurality of indications of conditions being met for a plurality of user equipment, and wherein sending further includes sending at least one message from the first base station to the other entity, the at least one message including indications of the conditions being met for the plurality of user equipment.

In another exemplary embodiment, an apparatus includes means for sending a message from a first base station to another entity in a radio network, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time.

A further exemplary embodiment is an apparatus including the apparatus of the previous paragraph, wherein the message is only sent if the one or more conditions have been met. An additional exemplary embodiment is the apparatus of this paragraph and/or the previous paragraph, wherein the user equipment is handed into the first base station from a third base station, and wherein the other entity includes the third base station. A further exemplary embodiment is an apparatus including the apparatus of this paragraph and/or the previous paragraph, wherein the condition of the signal strength further includes the condition of the signal strength of the second cell as measured by the user equipment and reported to the first base station is better according to at least one criterion than the signal strength of the first cell for the threshold duration of time. In yet another exemplary embodiment, an apparatus includes any of the apparatus of this paragraph and/or the previous paragraph, and further includes the first base station determining whether the one or more conditions have been met and sending the message in response to a determination the one or more conditions have been met. Another exemplary embodiment includes an apparatus of any one of the apparatus in this and/or a previous paragraph, wherein the user equipment is handed into the first base station from a third base station serving a third cell, and wherein the one or more conditions further include one or more of the following: a velocity of the user equipment is less than a threshold velocity; the second cell is a neighbor of the third cell; the second cell is in an outbound handover list; the third cell is in an inbound handover list; a cell type associated with the second cell; a cell type associated with the first cell; a cell type associated with the second cell is a same as the cell type of the third cell; the cell type associated with the second cell is the same as the cell type of the third cell and the cell type of the first cell is of a different cell type than the cell type of the second and third cells; or the second and third cells are controlled by a same base station controller which is different than the base station controller controlling the first cell. Another exemplary embodiment is an apparatus of any one of this paragraph and/or the preceding paragraph, wherein the one or more conditions further include an amount of data exchanged by the first base station with the user equipment is greater than a second, threshold. A further exemplary embodiment includes an apparatus of this paragraph and/or the previous paragraph, wherein the one or more conditions further include an amount of data exchanged per second by the first base station with the user equipment is greater than a third threshold. In another exemplary embodiment, an apparatus includes any of the apparatus of this and/or a previous paragraph, further including means for aggregating a plurality of indications of conditions being met for a plurality of user equipment, and wherein the means for sending further includes means for sending at least one message from the first base station to the other entity, the at least one message including indications of the conditions being met for the plurality of user equipment.

In a further exemplary embodiment, an apparatus includes one or more processors and one or more memories including computer program code. The one or more memories and the computer program code are configured, with the one or more processors, to cause the apparatus to perform at least the following: sending a message from a first base station to another entity in a radio network, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time.

Another exemplary embodiment includes a computer program including code for sending a message from a first base station to another entity in a radio network, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time, when the program is run on a data processing apparatus. The computer program of this paragraph, wherein the computer program is a computer program product including a computer-readable medium bearing computer program code embodied therein for use with a computer.

An additional exemplary embodiment is a computer program product including a computer-readable storage medium bearing computer program code embodied therein for use with a computer. The computer program code including: sending a message from a first base station to another entity in a radio network, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time.

In a further exemplary embodiment, a method is disclosed that includes receiving a message from a first base station, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time, wherein the receiving occurs in an entity other than the first or second base stations in the radio network.

Another exemplary embodiment is a method including the method of the previous paragraph, wherein the entity includes a third base station, and wherein the user equipment is handed into the first base station from the third base station. A further exemplary embodiment is a method including the methods in this paragraph and/or the previous paragraph, wherein the condition of the signal strength further includes the condition of the signal strength of the second cell as measured by the user equipment and reported to the first base station is better according to at least one criterion than the signal strength of the first cell for the threshold duration of time. An addition exemplary embodiment is a method including any method of this and/or a previous paragraph, wherein the entity includes a third base station, wherein the user equipment is handed into the first base station from the third base station serving a third cell, and wherein the one or more conditions further includes one or more of the following: a velocity of the user equipment is less than a threshold velocity; the second cell is a neighbor of the third cell; the second cell is in an outbound handover list; the third cell is in an inbound handover list; a cell type associated with the second cell; a cell type associated with the first cell; a cell type associated with the second cell is a same as the cell type of the third cell; the cell type associated with the second cell is the same as the cell type of the third cell and the cell type of the first cell is of a different cell type than the cell type of the second and third cells; or the second and third cells are controlled by a same base station controller which is different than the base station controller controlling the first cell. An additional exemplary method includes any one of the methods in this paragraph and/or the previous paragraph, wherein the one or more conditions further include an amount of data exchanged by the first base station with the user equipment is greater than a second threshold. An additional exemplary method includes any one of the methods in this paragraph and/or the previous paragraph, wherein the one or more conditions further include an amount of data exchanged per second by the first base station with the user equipment is greater than a third threshold. A further exemplary embodiment is a method of any of any one of the methods in this paragraph and/or the previous paragraph, wherein receiving further includes receiving at least one message from the first base station, the at least one message including indications of the conditions being met for a plurality of user equipment.

An apparatus in an additional exemplary embodiment includes means for receiving a message from a first base station, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time; wherein the means for receiving is part of an entity other than the first or second base stations in the radio network.

Another exemplary embodiment is an apparatus including the apparatus of the previous paragraph, wherein the entity includes a third base station, and wherein the user equipment is handed into the first base station from the third base station. A further exemplary embodiment is an apparatus including the apparatus in this paragraph and/or the previous paragraph, wherein the condition of the signal strength further includes the condition of the signal strength of the second cell as measured by the user equipment and reported to the first base station is better according to at least one criterion than the signal strength of the first cell for the threshold duration of time. An addition exemplary embodiment is any apparatus of this and/or a previous paragraph, wherein the entity includes a third base station, wherein the user equipment is handed into the first base station from the third base station serving a third cell, and wherein the one or more conditions further includes one or more of the following: a velocity of the user equipment is less than a threshold velocity; the second cell is a neighbor of the third cell; the second cell is in an outbound handover list; the third cell is in an inbound handover list; a cell type associated with the second cell; a cell type associated with the first cell; a cell type associated with the second cell is a same as the cell type of the third cell; the cell type associated with the second cell is the same as the cell type of the third cell and the cell type of the first cell is of a different cell type than the cell type of the second and third cells; or the second and third cells are controlled by a same base station controller which is different than the base station controller controlling the first cell. An additional exemplary apparatus includes any one of the apparatus in this and/or the previous paragraph, wherein the one or more conditions further include an amount of data exchanged by the first base station with the user equipment is greater than a second threshold. A further exemplary apparatus includes any one of the apparatus in this and/or the previous paragraph, wherein the one or more conditions further include an amount of data exchanged per second by the first base station with the user equipment is greater than a third threshold. In yet another exemplary embodiment, an apparatus includes any of the apparatus of this and/or the previous paragraph, wherein the means for receiving further includes means for receiving at least one message from the first base station, the at least one message including indications of the conditions being met for a plurality of user equipment.

In another exemplary embodiment, an apparatus includes one or more processors and one or more memories including computer program code. The one or more memories and the computer program code are configured, with the one or more processors, to cause the apparatus to perform at least the following: receiving a message from a first base station, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time; wherein the receiving occurs in an entity in a radio network other than the first or second base stations in the radio network.

Another exemplary embodiment includes a computer program including code for receiving a message from a first base station, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time; wherein the receiving occurs in an entity in a radio network other than the first or second base stations in the radio network, when the program is run on a data processing apparatus. The computer program of this paragraph, wherein the computer program is a computer program product including a computer-readable medium bearing computer program code embodied therein for use with a computer.

A further example is a computer program product including a computer-readable storage medium bearing computer program code embodied therein for use with a computer, the computer program code including: receiving a message from a first base station, wherein the message includes one or more indications that one or more conditions have been met, and wherein the one or more conditions include one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time; wherein the receiving occurs in an entity other than the first or second base stations in the radio network.

An additional exemplary embodiment includes any of the previous paragraphs, wherein the user equipment is handed into the first base station from a third base station serving a third cell, wherein the first base station receives at least one configuration parameter forming at least part of the one or more conditions and indications of the one or more conditions from the third base station, and wherein the at least one configuration parameter or the indications of the one or more conditions or both received from the third base station is contained in an X2 HANDOVER REQUEST message.

In a further exemplary embodiment, any of the means described above or below may be performed by one or more of logic operations implemented in hardware (e.g., an integrated circuit such as an application-specific integrated circuit) and/or implemented by one or more processors specifically programmed by computer program code to cause the apparatus to perform the logic operations.

A further exemplary embodiment is a system that includes any one or more of the apparatus in any of the previous paragraphs.

BRIEF DESCRIPTION OF THE DRAWINGS

In the attached Drawing Figures:

FIG. 8 shows examples of possible conditions used in FIG. 7.

FIG. 9 shows examples of possible parameters for the exemplary conditions in FIG. 8.

FIG. 10 shows examples of possible indication(s) that the exemplary condition(s) in FIG. 8 have been met.

DETAILED DESCRIPTION OF THE DRAWINGS

As stated above, the HetNet configuration may provide higher data throughput and reduced latency. One possible implementation for a HetNet is a controller that controls multiple base stations, each base station creating a small cell within the macro cell. With HetNet, handovers of user equipment from one of the small cells controlled by the controller, "up" to the macro cell, and back "down" to a different small cell under the same controller results in unnecessary costs such as a greater risk for dropped calls and additional signaling through the core network. For instance, the handover sequence might be from small cell A to macro cell B to small cell C, where the time duration that the UE remains connected to cell B (dwell time) is very short. Another example where there are unnecessary costs is a handover sequence from a macro cell A to a femto cell B and then to another macro cell C. For a fast moving user equipment, it would be beneficial to avoid handovers to the femto cell B and from the femto cell B to the macro cell C.

It would be advantageous to identify specific algorithms and conditions for detecting and reporting these scenarios to enable avoidance and/or management of these scenarios. Additional such exemplary scenarios are shown in FIGS. 1-5.

Figure 1:
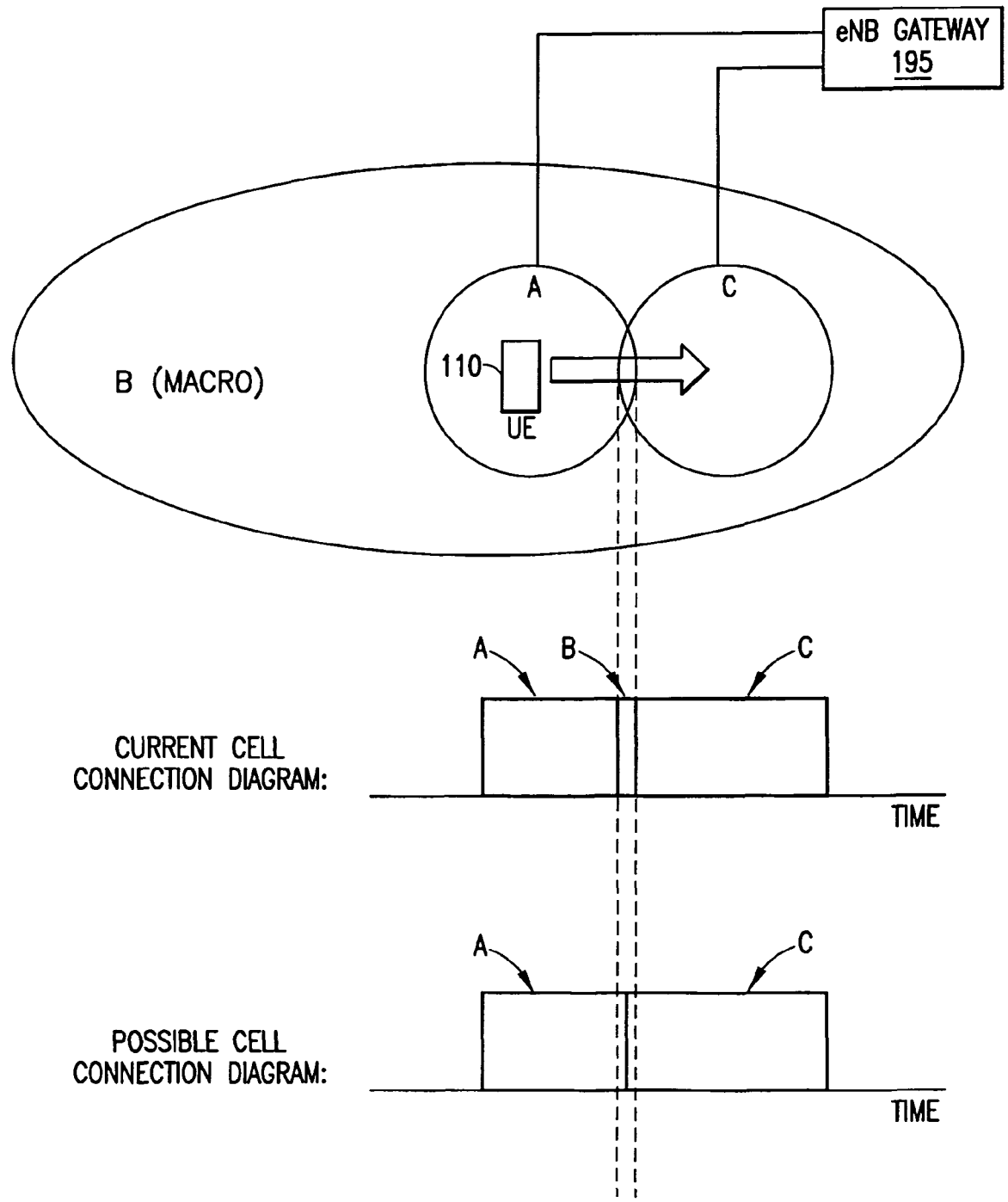
FIGS. 1-5 illustrate different cell and corresponding handover (HO) scenarios.

FIG. 1 shows a scenario involving a HetNet configuration. In this configuration, an eNB gateway 195 controls multiple base stations, referred to as eNBs in this instance. An eNB (evolved Node B, defined in third generation partnership project (3GPP) long term evolution (LTE) wireless communication standards) contains radio frequency transmitter(s) and receiver(s) which enable user equipment (UE) to communicate with the network. eNBs are merely exemplary, and any base station that provides access to a radio network may be used. In this example, the user equipment (UE) 110 has a path through cells A, B, and C as indicated by an arrow. A current cell connection diagram indicates a possible handover scenario. The handover scenario progresses from small cell A to macro cell B and then to small cell C. The "small" cells may be femto, pico, or micro cells as examples. Both small cells A and C are under the control of eNB gateway 195. Each cell A, B, and C is served by a corresponding base station, not shown in this figure but shown in FIG. 6. The current cell connection diagram indicates the inefficiency of the transient handover to cell B, which is remedied by the possible cell connection diagram in which the handover sequence proceeds from cell A to cell C without a handover to cell B.

Figure 2:
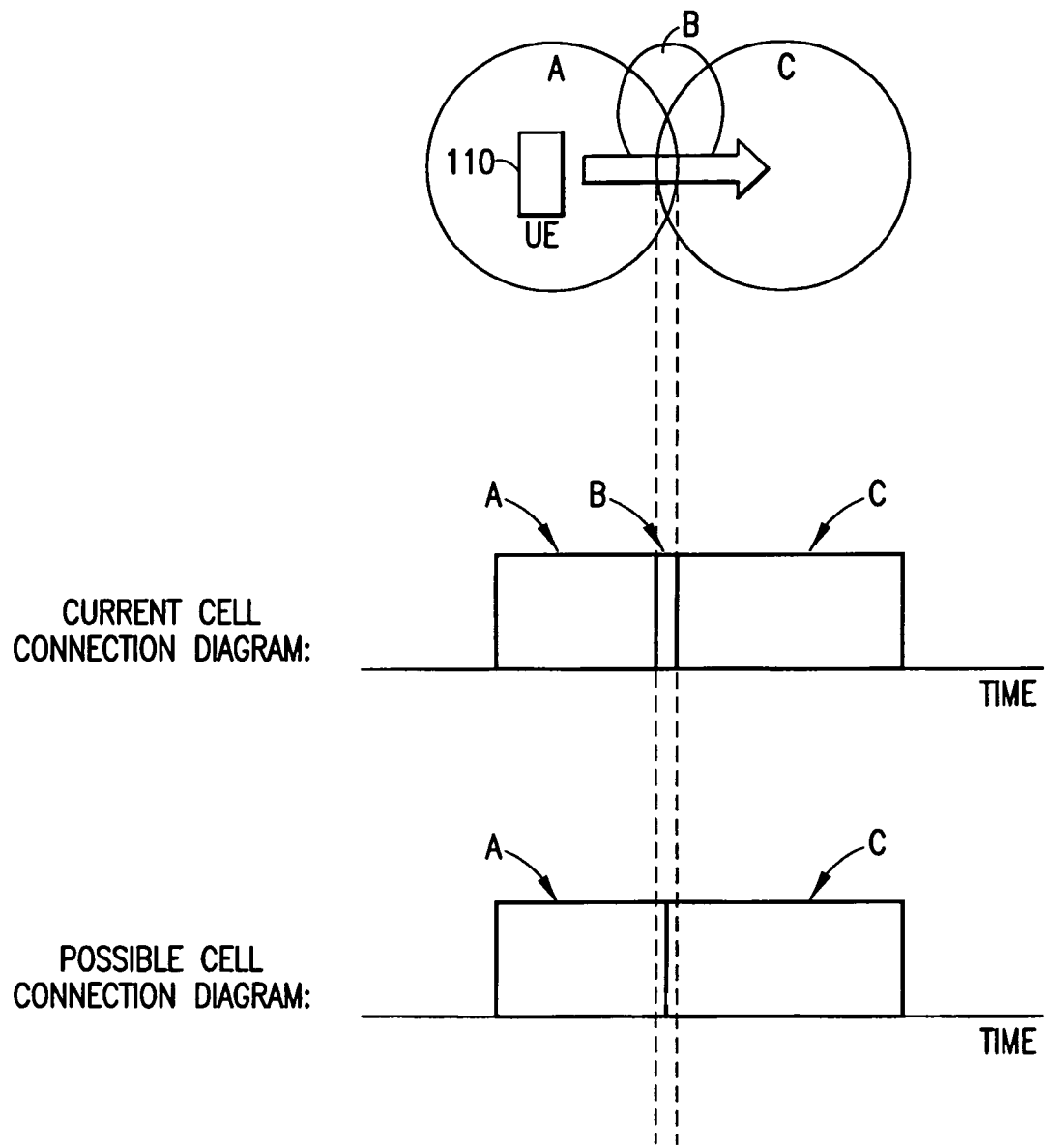

Another example scenario is shown in FIG. 2, in which cells A, B, and C are illustrated as being small or macro cells or some combination of these (e.g., cell A and cell C are macro cells while cell B is a small cell). The current cell connection diagram illustrates the inefficiency of the transient handover to cell B, which is remedied by the possible cell connection diagram in which the handover sequence proceeds from cell A to cell C without a handover to cell B. There may be an eNB gateway (or eNB gateways) controlling one or more of the cells A, B, or C.

Figure 3:
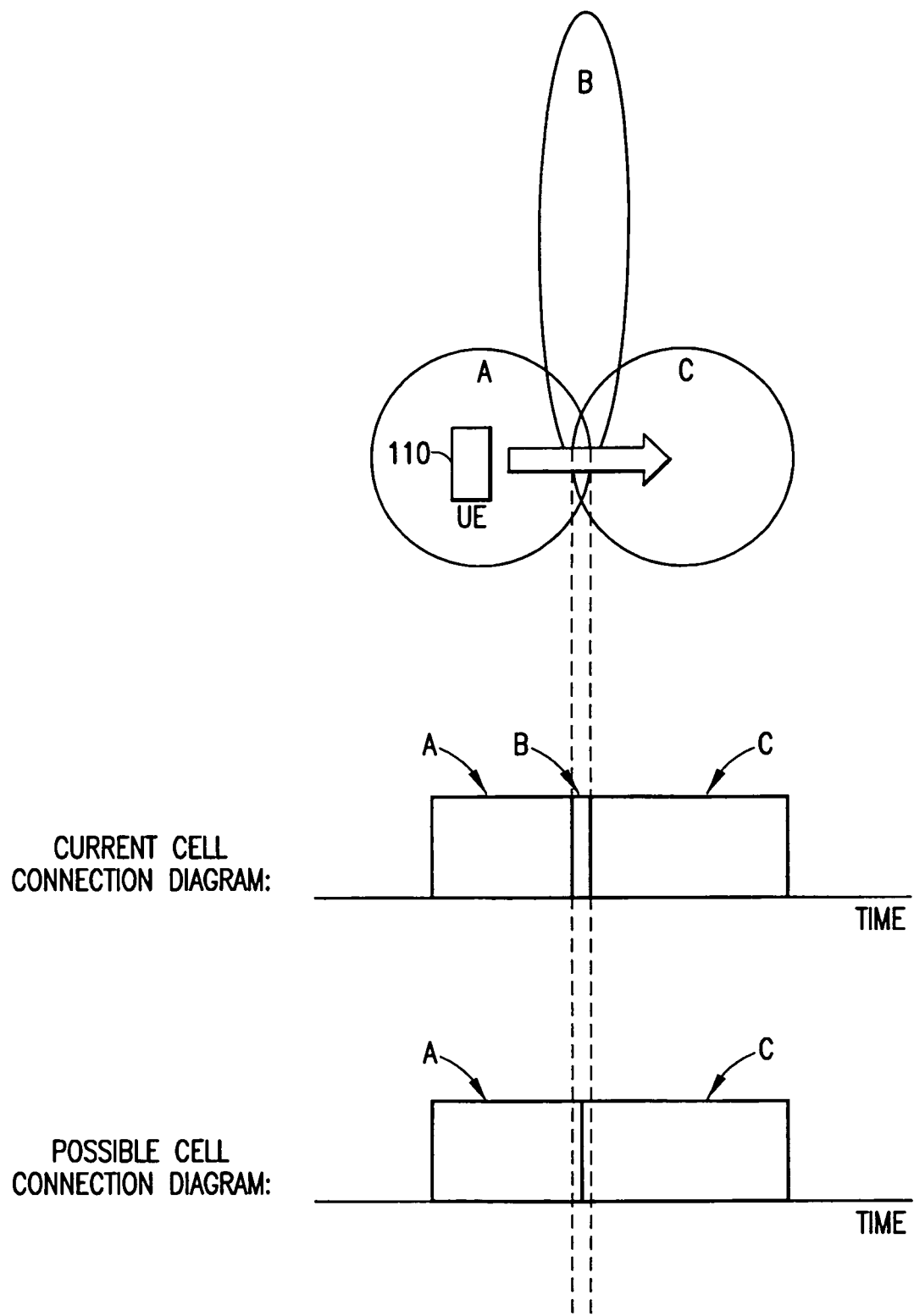

An additional example scenario is shown in FIG. 3, in which cells A, B, and C are illustrated as being small or macro cells or some combination of these. This scenario might occur, for example, for "long" cells (cell B) between city blocks. The current cell connection diagram illustrates the inefficiency of the transient handover to cell B, which is remedied by the possible cell connection diagram in which the handover sequence proceeds from cell A to cell C without a handover to cell B. There may be an eNB gateway (or eNB gateways) controlling one or more of the cells A, B, or C.

Figure 4:
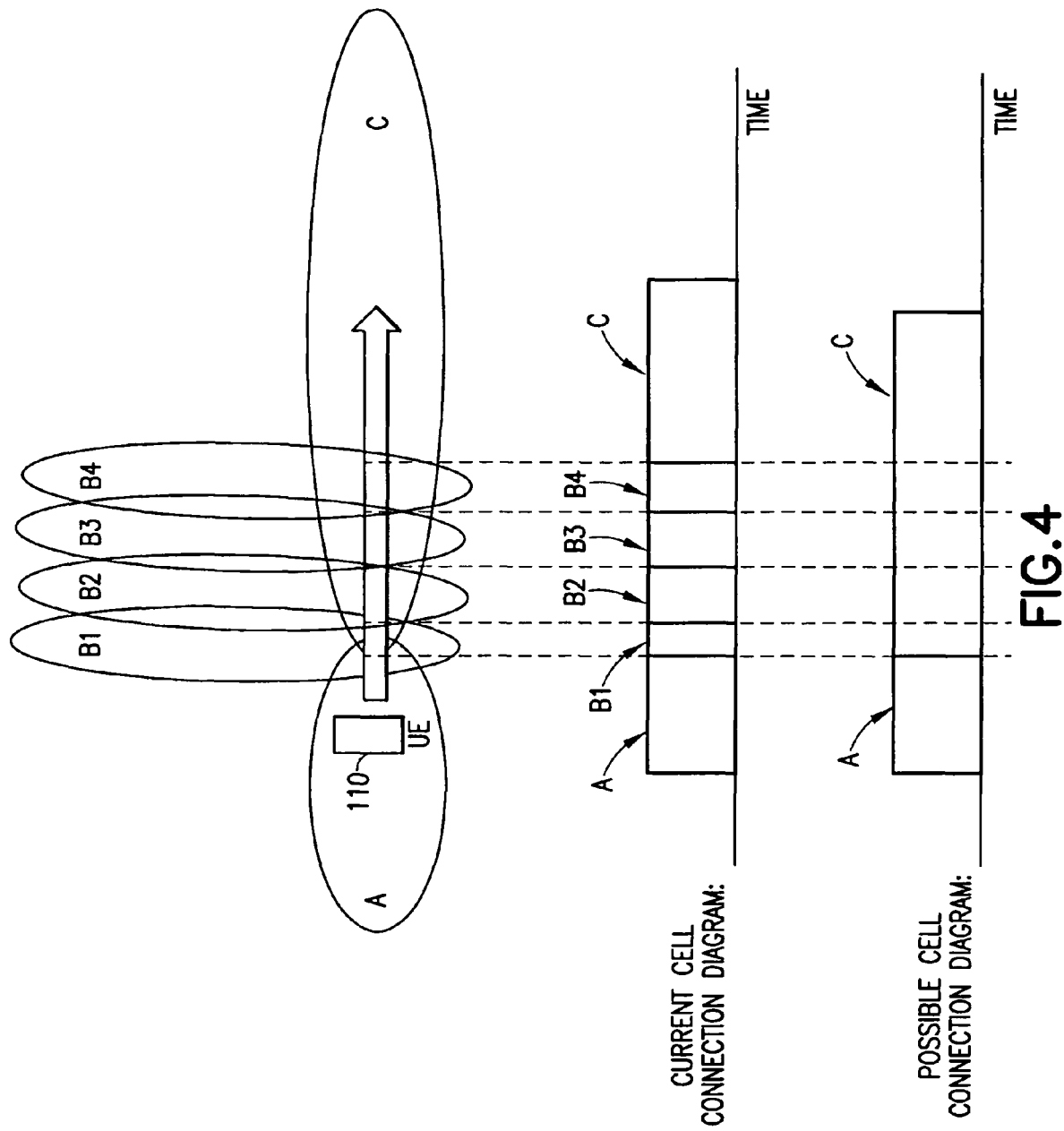

A further example scenario is shown in FIG. 4, in which cells A, B, and C are illustrated as being small or macro cells or some combination of these. In this example, there are multiple "B" cells, B1 through B4. The current cell connection diagram illustrates the inefficiency of the transient handovers to cells B1, B2, B3, and B4. These handovers and their corresponding increased signaling are remedied by the possible cell connection diagram in which the handover sequence proceeds from cell A to cell C without a handover to any of the cells B1, B2, B3, or B4. There may be an eNB gateway (or eNB gateways) controlling one or more of the cells A, B1, B2, B3, B4, or C.

The fourth scenario is similar to the third scenario shown in FIG. 3, except one might visualize that the fourth scenario would occur when a person is walking up the stairs in a building or is going up an elevator, where each floor has a sector (one of cells B1-B4) covering the floor, and there is one vertical sector (cell C) that is covering the stairwell/elevator. As another example, the fourth scenario could occur when a user is driving down a street running east to west, and the user crosses a number of north-south running streets (serviced by cells B1 to B4) in a row. It would be beneficial for a radio network to avoid handing off the north-south streets because the user is on a path coincident with an east-west cell (cell C).

One note to make about the fourth scenario is that if the user equipment were to stay on the cell C the entire time instead of handing off into any of the vertical cells (B1 through B4), then that might result in more radio frequency (RF) loading (even though this situation would result in fewer handovers). This occurs, for example, because while the user equipment is within the coverage areas of cells B1 or B2, the user equipment will be farther away from the center of cell C and its corresponding cell tower, than the user equipment would have been away from the center of cells B1 or B2. However, the distance between the user equipment and the tower is less important or not important as long as, e.g.: 1) the user equipment is not transferring a particularly large amount of data or physical resource blocks over the air; or 2) the base station to which the user equipment is connected (or the radio network in general) is not particularly loaded from an RF capacity perspective, e.g. in the case where not all of the physical resource blocks over the air are actually being used during this time interval.

Figure 5:
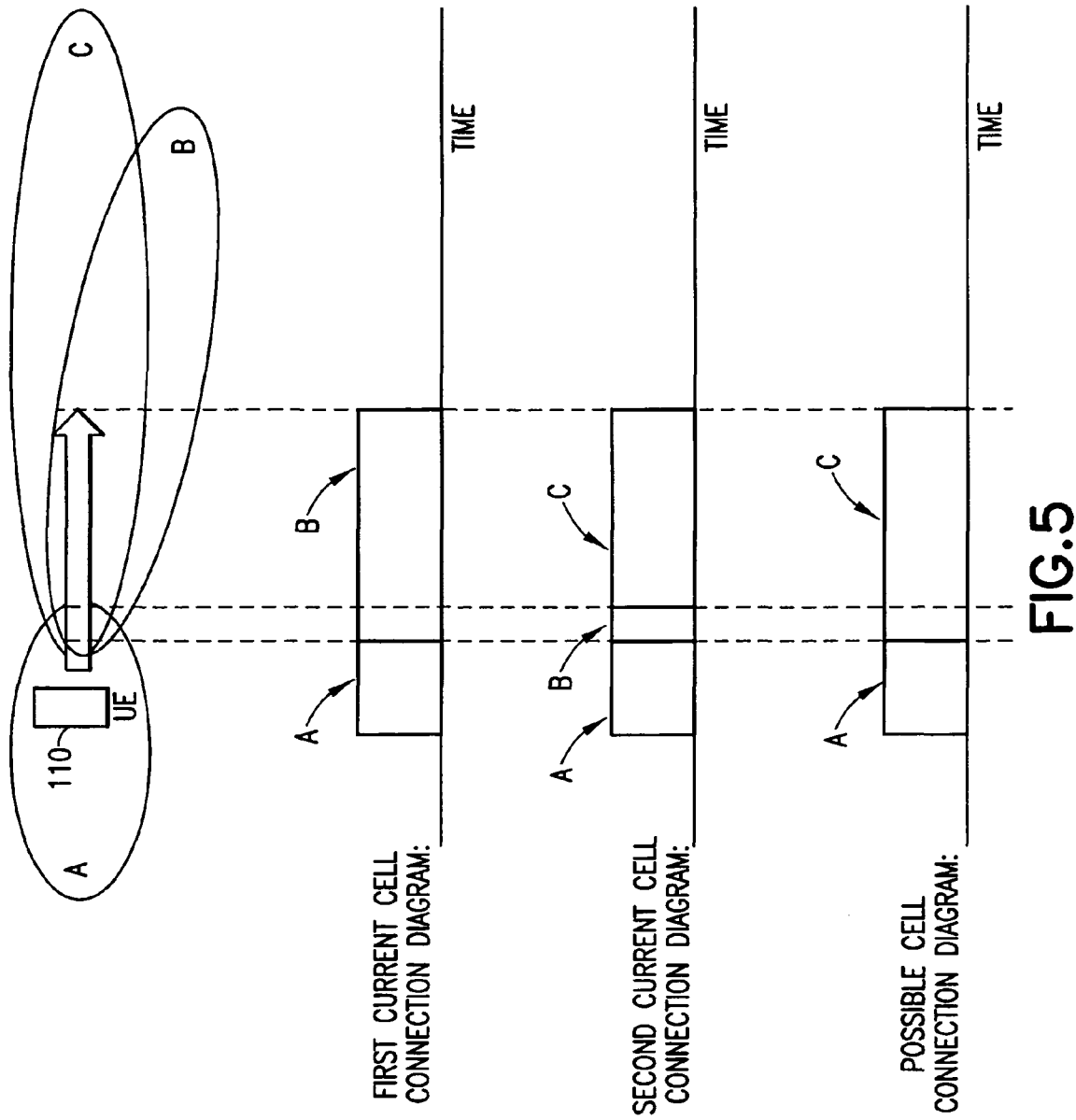

Yet another example scenario is shown in FIG. 5, in which cells A, B, and C are illustrated as being small or macro cells or some combination of these. The first current cell connection diagram illustrates the inefficiency of the transient handover to cell B. The second current cell connection diagram illustrates another inefficiency of a transient handover to cell B. These inefficiencies are remedied by the possible cell connection diagram, in which the handover sequence proceeds from cell A to cell C without a handover to cell B. There may be an eNB gateway (or eNB gateways) controlling one or more of the cells A, B, or C. A similar note as given above with respect to FIG. 4 is also applicable to FIG. 5: there may be locations where, if the user equipment were connected to cell C as in the possible cell connection diagram, the user equipment would be farther away from the cell tower in cell C than the user equipment would be from the cell tower in cell B. However, the distance between the user equipment and the tower is less important or not important as long as, e.g.: 1) the user equipment is not transferring a particularly large amount of data or physical resource blocks over the air; or 2) the base station to which the user equipment is connected (or the radio network in general) is not particularly loaded from an RF capacity perspective.

The radio network should be able to make decisions to effect the possible cell connection diagrams shown in FIGS. 1-5. The exemplary embodiments of the instant invention provide condition reporting to enable possible reduction in radio network inefficiencies such that the radio network can determine to effect (or not effect) the possible cell connection diagrams shown in FIGS. 1-5. In general, the system may achieve this through adjustment of antenna tilt (e.g., change the cell coverage area), adjustment of the measurement report time to trigger parameters (e.g., trigger handover sooner), adjustment of measurement offsets (e.g., close the gap between cells as depicted), while avoiding RF loss. Additional detail about condition reporting to enable possible reduction in radio network inefficiencies is presented after description of FIG. 6.

Figure 6:
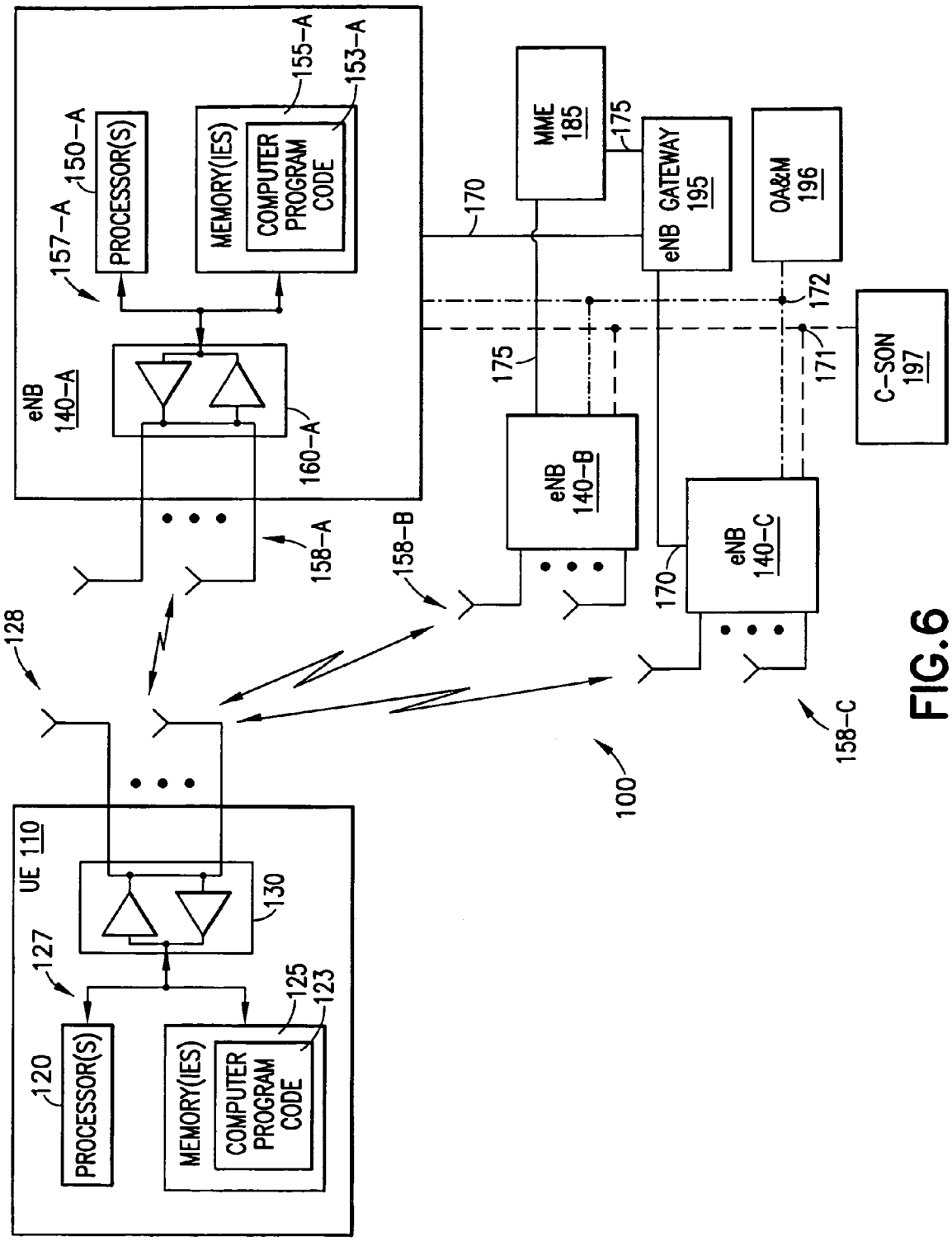
FIG. 6 illustrates a simplified block diagram of a system in which exemplary embodiments of this invention may be practiced.

Turning now to FIG. 6, FIG. 6 illustrates a simplified block diagram of a system into which exemplary embodiments of this invention may be practiced. In FIG. 6, a user equipment (UE) 110 is in wireless communication with a radio network 100. The user equipment 110 includes one or more processors 120, one or more memories 125, and one or more transceivers 130 interconnected through one or more buses 127. The one or more transceivers 130 are connected to one or more antennas 128. The one or more memories 125 include computer program code 123. The one or more memories 125 and the computer program code 123 are configured to, with the one or more processors 120, cause the user equipment 110 to perform one or more of the operations as described herein.

The radio network 100 includes three eNBs 140-A, 140-B, and 140-C and may include some combination of MME 185, eNB gateway 195, an operations, administration, and maintenance (OA&M) server 196 (which may be referred to as an O&M server or an OMC, operations and maintenance center, depending on configuration), and a centralized self organizing network (C-SON) server 197. The internal elements of eNB 140-A will be described herein, and it is assumed the eNBs 140-B and 140-C are similar. The eNB 140-A includes one or more processors 150-A, one or more memories 155-A, and one or more transceivers 160-A interconnected through one or more buses 157-A. The one or more transceivers 160-A are connected to one or more antennas 158-A. The one or more memories 155-A include computer program code 153-A. The one or more memories 155-A and the computer program code 153-A are configured to, with the one or more processors 150-A, cause the eNB 140-A to perform one or more of the operations as described herein.

As shown in the previous figures, each of the eNBs 140 serves at least one corresponding cell. As also shown in FIG. 1, an eNB gateway 195 can control one or more of the eNBs 140 via a network 170. In this example, the eNB gateway 195 controls the eNBs 140-A and 140-C, but this is merely exemplary. The network 170 may implement, e.g., an S1 interface. The radio network 100 also includes a mobility management entity (MME) 185, connected in this example to the eNB 140-B and the eNB gateway 195, although the MME 185 may be connected to only the eNB 140-B instead, or may be connected to all three eNBs 140, depending on implementation. The network 175 could implement an S1 interface. The MME 185 is one type of base station controller, and other types are possible. The OA&M server 196 uses network 172 to communicate with the eNBs 140, and the network 172 can be any suitable network with any appropriate interface (e.g., Internet Protocol). The C-SON server 197 uses network 171 to communicate with the eNBs 140, and the network 171 can be any suitable network with any appropriate interface (e.g., Internet Protocol).

In general, the various embodiments of the user equipment 110 can include, but are not limited to, cellular telephones such as smartphone, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

The computer readable memories 125 and 155 may be of any type suitable to the local technical environment and may be implemented using any suitable data storage technology, such as semiconductor based memory devices, flash memory, magnetic memory devices and systems, optical memory devices and systems, fixed memory and removable memory.

The processors 120 and 150 may be of any type suitable to the local technical environment, and may include one or more of general purpose computers, special purpose computers, microprocessors, digital signal processors (DSPs) and processors based on a multi-core processor architecture, as non-limiting examples.

Figure 7:
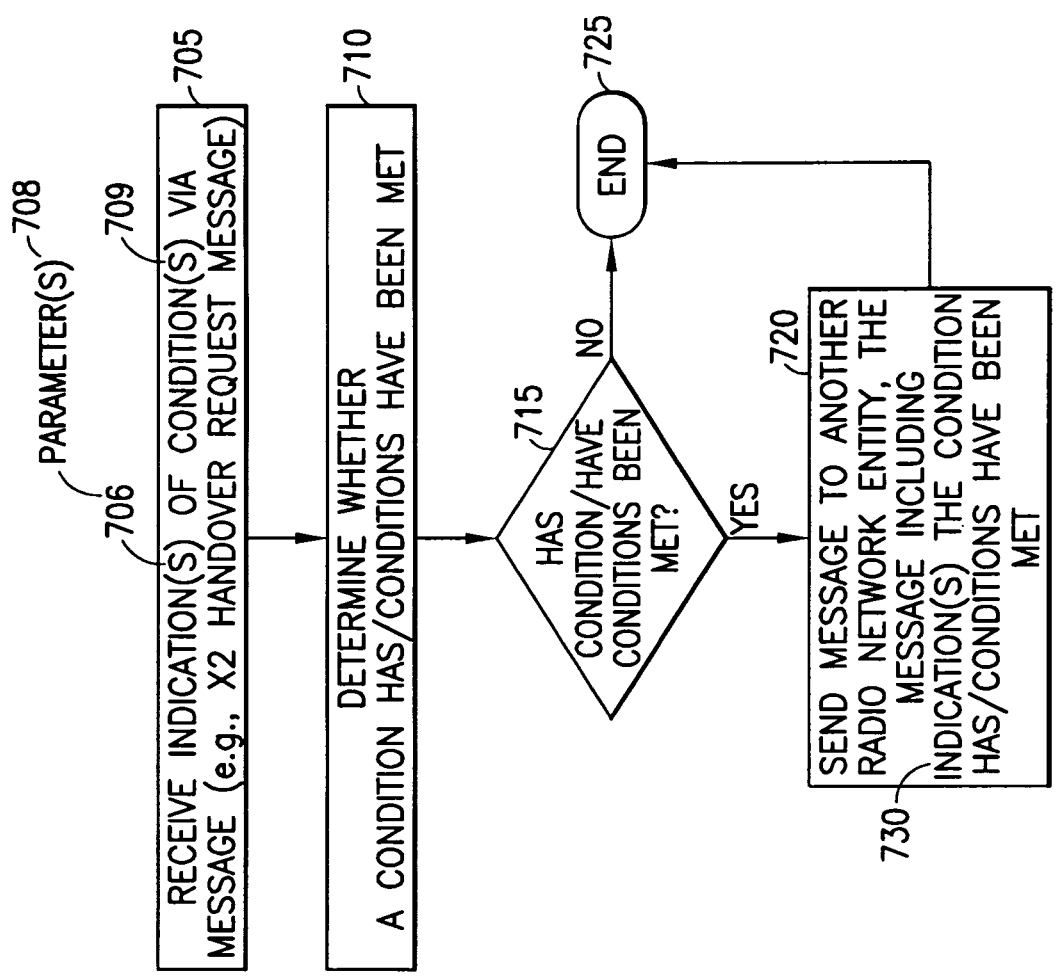
FIG. 7 illustrates a flowchart of a method for condition reporting to enable possible reduction in radio network inefficiencies in accordance with an exemplary embodiment of the instant invention.

Referring now to FIG. 7, this figure illustrates a flowchart of a method for condition reporting to enable possible reduction in radio network inefficiencies in accordance with an exemplary embodiment of the instant invention. The blocks in the method may be performed by computer program code 153 executing on the one or more processors 150 to cause an eNB (e.g., eNB 140-B in the examples of FIGS. 1-5) to perform the operations, or the blocks may be performed by hardware such as an integrated circuit defined to perform the operations, or there could be some combination of software executing on hardware and hardware defined to perform operations. The blocks may be combined or further subdivided.

It is assumed herein that the eNB 140-B is the entity in the radio network 100 performing the operations in FIG. 7, and the eNB 140-B serves the cell B in FIGS. 1-3 and 5 or one or more of the cells B1-B4 in FIG. 4. eNB 140-A serves cell A and eNB 140-C serves cell C. It is noted that the references herein to cells A, B, and C and eNBs 140-A, 140-B, and 140-C are not intended to be limiting. For instance, there may never be a handover to a "cell C" in certain situations. These references are used solely for ease of exposition. The method begins in block 705, when the eNB 140-B receives indication(s) 706 of condition(s) 709 via a message or multiple messages. For instance, the message may be an X2 HANDOVER REQUEST message received from the eNB 140-A. The message may also be received from a base station controller (e.g., MME 185) associated with the eNB 140-B, from a C-SON server 197, or from an OA&M server 196. Exemplary conditions 709 are described below in reference to FIG. 8. The indication(s) 706 may further include parameter(s) 708, which at least partially define corresponding conditions 709. Exemplary parameters 708 are shown in FIG. 9 for the conditions 709 shown in FIG. 8. It is noted that block 705 may not be used in certain instances, such as when the eNB 140-B is programmed with the conditions 709 and therefore does not receive a message with indications of the conditions.

In block 710, the eNB 140-B determines whether a condition 709 has been met or whether multiple conditions 709 have been met. The condition 709 is associated with a user equipment 110 entering cell B (served by eNB 140-B) via handover from cell A (served by eNB 140-A). The condition 709 therefore indicates cell B (i.e., its eNB 140-B or a controlling entity of eNB 140-B) detects a higher likelihood that the user equipment was better suited for handover from cell A directly to a third cell (e.g., cell C served by eNB 140-C). In general, the condition 709 is unrelated to radio link failure associated with the user equipment.

In block 715, the eNB 140-B determines if one or more of the conditions has been met. If not (block 715=No), the method ends in block 725. If so (block 715=Yes), in block 720, the eNB 140-B sends a message to another radio network entity. The other entity could be one (or more) of the base station eNB 140-A, a base station controller (eNB gateway 195) controlling the base station eNB 140-A, or a centralized SON server 197. The message includes one or more indications 730 indicating at least that the condition has/conditions have been met. This message can be UE specific or can aggregate information from multiple UEs. Aggregation means the eNB 140-B accumulates conditions for multiple user equipment 110 and sends the accumulated conditions in one or multiple messages in block 720. It is then up to the entity (and perhaps other entities of the radio network 100) to determine what to do with the reported condition.

Referring to FIG. 8, this figure shows examples of possible conditions 709 used in FIG. 7. In FIG. 8 (and FIGS. 9 and 10), the numbers assigned to the conditions are merely for ease of reference. Furthermore, the terms "cell A", "cell B", and "cell C" are used solely for ease of reference. In this example, a cell B is assumed to be served by eNB 140-B, a cell A is assumed to be served by eNB 140-A, and a cell C is assumed to be served by eNB 140-C. FIG. 8 (and FIGS. 9 and 10) consider an exemplary scenario of a handover sequence from cell A to cell B to cell C. FIGS. 1 to 5 may be used to help visualize these exemplary scenarios. It is noted that a user equipment 110 may never actually be handed over to cell C.

Regarding item (1), the condition 709 is a duration that the user equipment is connected to cell B is less than a threshold. This condition 709 indicates that the time spent in cell B is of short duration as defined by the threshold such that the user equipment 110 was better suited for handover from cell A directly to cell C.

Regarding item (2), the condition 709 is signal strength of cell C as measured by the user equipment and reported to the base station serving cell B is better than a signal strength of cell B for a threshold duration of time. This condition 709 indicates the user equipment 110 should likely have been handed over to cell C instead of cell B. It is noted that the signal strength may have to meet certain criteria (as shown in FIG. 9). Such criteria include measurement report criteria (e.g., a dB threshold indicating how much cell C is stronger than cell B, or an absolute dB threshold associated with strength of cell C).

Concerning item (3), the condition 709 is an amount of data exchanged by cell B with the user equipment 110 is greater than a first threshold. Regarding item (4), the condition 709 is an amount of data exchanged per second by cell B with the user equipment 110 is greater than a second threshold. These conditions 709 mean that cell B reports users with data requirements deemed to be high. As stated above with respect to FIGS. 4 and 5, distance between the user equipment and the cell tower (cell B in this example) is less important or not important as long as, e.g.: 1) the user equipment is not transferring a particularly large amount of data or physical resource blocks over the air; or 2) the base station to which the user equipment is connected (or the radio network in general) is not particularly loaded from an RF capacity perspective. In the case of high data requirements for a user, then proximity to a tower can become more important and the conditions 709 for items (3) or (4) might be used by the radio network 100 and considered in reconfiguring the radio network 100 to create the possible cell connection diagrams shown in FIGS. 1-5. As an example, if the data rate between the user equipment 110 and cell B is high, cell B should have been skipped in favor of cell C. This is because if the data rate is high, then the user equipment 110 should have been handed over to the cell that was closest to the user equipment 110 over the long duration, rather than the cell that looked better at the moment the handover was triggered. If the data rate is low, then even if the user equipment 110 is not connected to the closest cell, there is little or no inefficiency. So cell B would feedback information only when a bad handover choice was made.

Regarding item (5), the condition 709 is a velocity of the user equipment 110 is less than a threshold velocity. If velocity is greater than the threshold velocity, then a short stay may not be inefficient. However, if velocity is less than the threshold (e.g., a pedestrian) and the user equipment 110 stayed in cell B for only a short time, then that was a poor choice from an efficiency perspective.

Concerning item (6), the condition 709 is that cell C is a neighbor of cell A. The neighbor relationship is shown in FIGS. 1-5 for cells A and C, where the cells abut each other. The neighbor relationship therefore means that cell C is eligible to be selected as a more likely candidate than cell B for handover, since without the neighbor relationship a handover from cell A directly to cell C may not be possible.

Regarding item (7), the condition 709 is that cell C is in an outbound handover list. Regarding item (8), the condition 709 is cell A is in an inbound handover list. Regarding the outbound handover list (condition 7) and inbound handover list (condition 8), these do not necessarily indicate that cell C should have been selected for handover instead of cell B. These two conditions are included if it is desired that a message be sent only if cell A is in the inbound handover list and/or cell C is in the outbound handover list. As such, these two conditions likely make sense in combination with other conditions (e.g., short dwell time and outbound handover was between two particular cells known to be neighbors) or as an embodiment with other conditions (e.g., if cell-B is a macro cell, the inbound and outbound handover lists might include only small cells to ensure that messages are generated only if small-macro-small occurs; but this does not necessarily mean that a direct cell A to cell C handover was possible since that might depend on the dwell time in cell B).

Concerning item (9), the condition 709 is a cell type associated with cell C, and concerning item (10), the condition 709 is a cell type associated with cell B. Concerning item (11), the condition 709 is a cell type associated with cell C is a same as the cell type of cell A, and concerning item (12), the condition 709 is that the cell type associated with cell C is the same as the cell type of cell A and the cell type of cell A is of a different cell type than the cell type of cells A and B. The cell type is an indication of, e.g., femto, pico, micro, macro cells, or a certain class of these (e.g., "small" cells meeting a first set of criteria and macro cells meeting a different set of criteria). These conditions 709 capture what is shown, e.g., in FIG. 1, where the small cells A and C abut each other and there is a transient handover from small cell A to the macro cell B and then to the small cell C. FIG. 1 is only one example, and a similar example would be where cells A and C are macro cells and cell B is a small cell. Yet other examples are possible. These examples indicate inefficiency in the current connection diagram of FIG. 1.

Concerning item (13), the condition 709 is that cell A and cell C are controlled by a same base station controller which is different than the base station controller controlling cell B. This condition 709 is an indication that handover to cell B is inefficient because the handover occurs between base station controllers rather than (if a handover only occurred from cell A directly to cell C) "within" a single base station controller. This may also be an indication that cells A and C belong to different operators or radio access technologies than the operator or radio access technology for cell B.

Regarding FIG. 5, a concern is to enable the radio network 100 to identify the case where two different oblong shaped cells (cells B and C) intersect. Normally there would be a better signal strength with the vertical oblong cell (cell B), but because of the direction of the user equipment 110, the radio network should choose the horizontal oblong cell (cell C). Cell B can trigger a report back to, e.g., cell A if the cell B executes a handover to cell C that occurs within a threshold time interval (or in other words there is a notification if cell B's coverage gets poor quickly and cell B successfully handovers to cell C). See item (1) of FIG. 8.

An issue is the handling of a scenario where handover from cell B to cell C is delayed. The scenario is as follows. Cell B may or may not hand over a particular user equipment to cell C, as it is implementation dependent whether cell B will hand over the user equipment to cell C when cell B's coverage is adequate, even though cell C is better than cell B. It would be preferable to directly handover the user equipment 110 to cell C, if after the user equipment arrives at cell B, the user equipment 110 spends a certain duration (see item (1) in FIG. 8), say one minute, in cell A and then hands off to cell C, but while the user equipment 110 is in cell B, cell C is always significantly stronger than cell B, although cell B has adequate strength.

An example of handling this scenario is as follows. In response to receiving a short visitation report query (e.g., in the message in block 705 of FIG. 1 and corresponding to item (1) of FIG. 8), cell B should configure the user equipment 110 and handover decisions to handover the user equipment 110 to cell C if the user equipment 110 measures cell C as being consistently stronger than measurements of cell B. Cell A will inform cell B that cell A also wants to have a reporting if the user equipment 110 stays in cell B for more than one minute, and during that time interval the measurements of cell C are consistently stronger than are measurements of cell B. See item (2) of FIG. 8.

Turning to FIG. 9, this figure shows examples of possible parameters 708 for the exemplary conditions 709 in FIG. 8. These parameters 708 shown in FIG. 9 are merely exemplary. The exemplary parameters 708 are as follows:
1) A duration;
2) A threshold duration of time, and measurement report criteria (e.g.: dB threshold indicating how much cell C is stronger than cell B, or an absolute dB threshold associated with strength of cell C);
3) A first threshold;
4) The second threshold;
5) The threshold velocity;
6) Neighbor information for cells A and C;
7) The outbound handover list;
8) The inbound handover list;
9) The cell type associated with cell C;
10) The cell type associated with cell B;
11) The cell types associated with cells A and C;
12) The cell types associated with cells A, B, and C; or
13) A list of which base station controllers control which cells for at least cells A, B, and C.

FIG. 10 shows examples of possible indication(s) 730 that the exemplary condition(s) in FIG. 8 have been met. There may be multiple indications 730 sent per message in block 720 of FIG. 8 or a single indication sent per message in block 720, or multiple messages sent. The exemplary indications 730 in FIG. 10 include the following:
1) Indication that a duration that the user equipment is connected to cell B is less than a threshold (e.g., and the duration);
2) Indication that signal strength as measured by the user equipment and reported to the cell B's base station of cell C is better than a signal strength of the cell B for a threshold duration of time;
3) Indication that an amount of data exchanged by cell B's base station with the user equipment is greater than a first threshold;
4) Indication that an amount of data exchanged per second by cell B's base station with the user equipment is greater than a second threshold;

5) Indication that a velocity of the UE is less than a threshold velocity;

6) Indication that cell C is a neighbor of cell A;

7) Indication that cell C is in an outbound handover list;

8) Indication that cell A is in an inbound handover list;

9) Indication that a cell type associated with cell C meets a predetermined cell type;

10) Indication that a cell type associated with cell B meets a predetermined cell type;

11) Indication that a cell type associated with cell C is a same as a cell type of cell A;

12) Indication that a cell type associated with cell C is the same as a cell type of cell A and the cell type of cell B is of a different cell type than the cell type of cells A and C; or 13) Indication that cells A and C are controlled by a same base station controller which is different than the base station controller controlling Cell B.

Additionally, the indications 730 may also include cell types or cell identities appropriate for 1-13 (see item 14).

Figure 11:
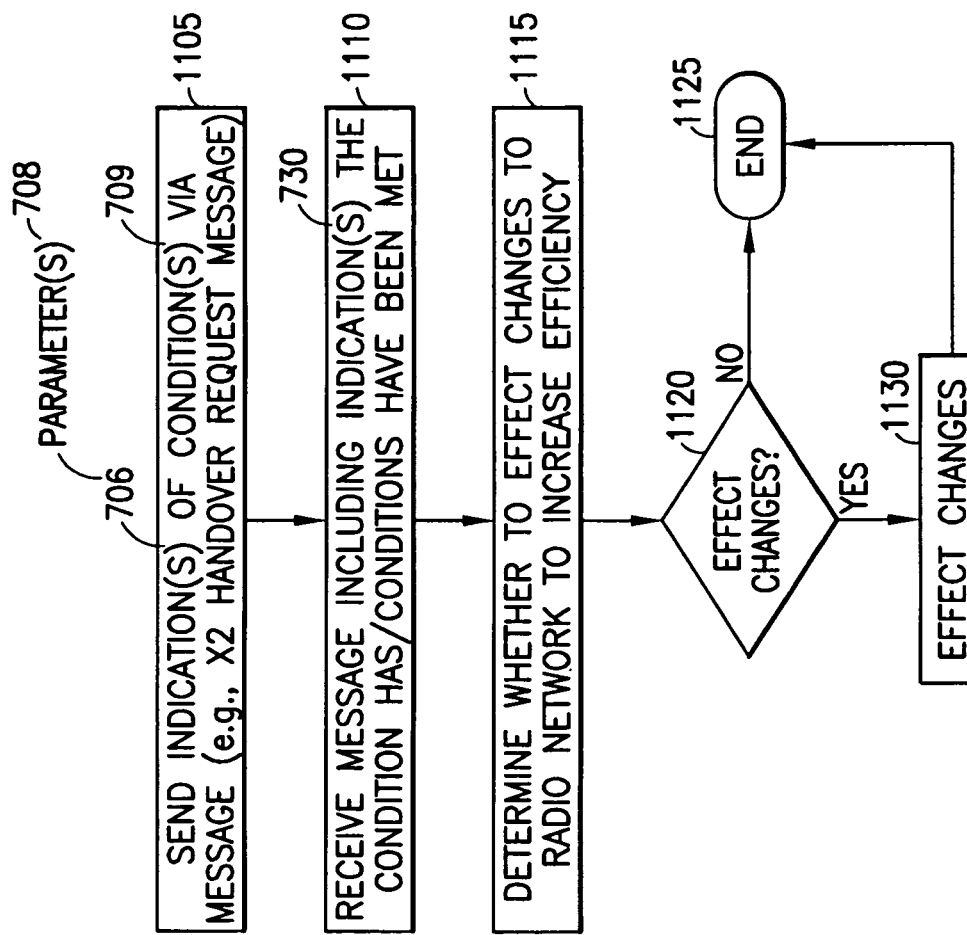
FIG. 11 illustrates a flowchart of another method for condition reporting to enable possible reduction in radio network inefficiencies in accordance with an exemplary embodiment of the instant invention.

Referring to FIG. 11, this figure illustrates a flowchart of another method for condition reporting to enable possible reduction in radio network inefficiencies in accordance with an exemplary embodiment of the instant invention. The operations in this figure are performed, e.g., by one or more entities in the radio network 100 able to configure handovers of user equipment 110 between cells. In block 1105, the entity or entities send indication(s) of condition(s) 709 via a message (or messages) (e.g., one or more X2 HANDOVER REQUEST messages). The indications 706 may also include parameter(s) 708, as previously described. In block 1110, the entity or entities receive one or more messages including indication(s) 730 the condition 709 has/conditions 709 have been met. In block 1115, the entity or entities determine whether to effect changes to radio network to increase efficiency. If not (block 1120=No), the method ends in block 1125.

If so (block 1120=Yes), block 1130 is performed. In block 1130, the changes are effected. In general, the system may achieve this through adjustment of antenna tilt (e.g., change the cell coverage area), adjustment of the measurement report time to trigger parameters (e.g., trigger handover sooner), adjustment of measurement offsets (e.g., close the gap between cells as depicted), while avoiding RF loss. The method ends in block 1125.

The following are examples. In an exemplary embodiment, (item 1) a method includes: sending a message from a first base station to another entity in a radio network, wherein the message comprises one or more indications that one or more conditions have been met, and wherein the one or more conditions comprise one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time.

Item 2. The method of item 1, wherein the message is only sent if the one or more conditions have been met. Item 3. The method of item 1 wherein the user equipment handed into the first base station from a third base station, and wherein the other entity comprises the third base station. Item 4. The method of item 1, wherein: the condition of the signal strength further comprises the condition of the signal strength of the second cell as measured by the user equipment and reported to the first base station is better according to at least one criterion than the signal strength of the first cell for the threshold duration of time.

Item 5. The method of item 1, wherein the user equipment handed into the first base station from a third base station serving a third cell, and wherein the one or more conditions further comprises one or more of the following: a velocity of the user equipment is less than a threshold velocity; the second cell is a neighbor of the third cell; the second cell is in an outbound handover list; the third cell is in an inbound handover list; a cell type associated with the second cell; a cell type associated with the first cell; a cell type associated with the second cell is a same as the cell type of the third cell; the cell type associated with the second cell is the same as the cell type of the third cell and the cell type of the first cell is of a different cell type than the cell type of the second and third cells; or the second and third cells are controlled by a same base station controller which is different than the base station controller controlling the first cell.

Item 6. The method of any one of items 1 or 5, further comprising the first base station determining whether the one or more conditions have been met and sending the message in response to a determination the one or more conditions have been met.

Item 7. The method of item 1, wherein the one or more indications further indicate one or more of the following: the duration; a cell identity associated with the second cell; a cell type associated with the first cell; or a cell type associated with the second cell.

Item 8. The method of item 1, wherein the user equipment handed into the first base station from a third base station serving a third cell, and wherein the method further comprises receiving, by the first base station, at least one configuration parameter forming at least part of the one or more conditions and indications of the one or more conditions from one of the third base station, a base station controller associated with the first base station, a centralized self-optimizing network server, or an operations, administration, and maintenance server.

Item 9. The method of item 8, wherein the at least one configuration parameter or the indications of the one or more conditions or both received from the third base station is contained in an X2 HANDOVER REQUEST message.

Item 10. The method of item 1, wherein sending further comprises sending the message to the other entity only if a subsequent inbound handover procedure for the user equipment to the first cell does not occur within a threshold time following an outbound handover procedure to the second cell.

Item 11. The method of item 1, further comprising aggregating a plurality of indications of conditions being met for a plurality of user equipment, and wherein sending further comprises sending at least one message from the first base station to the other entity, the at least one message comprising indications of the conditions being met for the plurality of user equipment.

Item 12. The method of any one of the preceding items 1 to 11, wherein the other entity comprises at least one of a third base station from which the user equipment is handed into the first cell, a base station controller controlling the third base station, a centralized self-optimizing network server, or an operations, administration, and maintenance server.

In another exemplary embodiment, (item 13) a method includes receiving a message from a first base station, wherein the message comprises one or more indications that one or more conditions have been met, and wherein the one or more conditions comprise one or both of the following: a duration the user equipment is connected to a first cell served by the first base station, prior to handover from the first cell to a second cell served by a second base station, is less than a threshold; or the signal strength of the second cell as measured by the user equipment and reported to the first base station is better than a signal strength of the first cell for a threshold duration of time; wherein the receiving occurs in an entity in a radio network other than the first or second base stations in the radio network.

Item 14. The method of item 13, wherein the entity comprises a third base station, and wherein the user equipment handed into the first base station from the third base station.

Item 15. The method of item 14, wherein: the condition of the signal strength further comprises the condition of the signal strength of the second cell as measured by the user equipment and reported to the first base station is better according to at least one criterion than the signal strength of the first cell for the threshold duration of time.

Item 16. The method of item 13, wherein the entity comprises a third base station, wherein the user equipment handed into the first base station from the third base station serving a third cell, and wherein the one or more conditions further comprises one or more of the following: a velocity of the user equipment is less than a threshold velocity; the second cell is a neighbor of the third cell; the second cell is in an outbound handover list; the third cell is in an inbound handover list; a cell type associated with the second cell; a cell type associated with the first cell; a cell type associated with the second cell is a same as the cell type of the third cell; the cell type associated with the second cell is the same as the cell type of the third cell and the cell type of the first cell is of a different cell type than the cell type of the second and third cells; or the second and third cells are controlled by a same base station controller which is different than the base station controller controlling the first cell.

Item 17. The method of item 13, wherein the one or more indications further indicate one or more of the following: the duration; a cell identity associated with the second cell; a cell type associated with the first cell; or a cell type associated with the second cell.

Item 18. The method of item 13, wherein the user equipment handed into the first base station from the third base station serving a third cell, and wherein the method further comprises sending to the first base station at least one configuration parameter forming at least part of the one or more conditions and indications of the one or more conditions from one of the third base station, a base station controller associated with the first base station, a centralized self-optimizing network server, or an operations, administration, and maintenance server.

Item 19. The method of item 18, wherein the at least one configuration parameter or the indications of the one or more conditions or both received from the third base station is contained in an X2 HANDOVER REQUEST message.

Item 20. The method of item 13, wherein receiving further comprises receiving the message from the first base station only if a subsequent inbound handover procedure for the user equipment to the first cell does not occur within a threshold time following an outbound handover procedure to the second cell. Item 21. The method of item 13, wherein receiving further comprises receiving at least one message from the first base station, the at least one message comprising indications of the conditions being met for a plurality of user equipment.

The method of any one of items 13 to 21, wherein the entity comprises at least one of a third base station from which the user equipment is handed into the first cell, a base station controller controlling the third base station, a centralized self-optimizing network server, or an operations, administration, and maintenance server.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 6. A computer-readable medium may comprise a computer-readable storage medium (e.g., memory or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
sending a message from a first base station to another entity in a radio network, wherein the message comprises one or more indications that one or more conditions have been met, and wherein the one or more conditions comprise both of the following:
a duration the user equipment is connected to a first cell served by the first base station, prior to handover from the first cell to a second cell served by a second base station, is less than a threshold; and
the signal strength of the second cell as measured by the user equipment and reported to the first base station is better than a signal strength of the first cell for a threshold duration of time,
wherein the user equipment is handed into the first base station from a third base station serving a third cell, and wherein the method further comprises receiving, by the first base station, at least one configuration parameter forming at least part of the one or more conditions and indications of the one or more conditions from one of the third base station, a base station controller associated with the first base station, a centralized self-optimizing network server, or an operations, administration, and maintenance server.

2. The method of claim 1, wherein the message is only sent if the one or more conditions have been met.

3. The method of claim 1, wherein the user equipment is handed into the first base station from a third base station.

4. The method of claim 1, wherein the user equipment is handed into the first base station from a third base station serving a third cell, and wherein the one or more conditions further comprise one or more of the following:
- a velocity of the user equipment is less than a threshold velocity;
- the second cell is a neighbor of the third cell;
- the second cell is in an outbound handover list;
- the third cell is in an inbound handover list;
- a cell type associated with the second cell;
- a cell type associated with the first cell;
- a cell type associated with the second cell is a same as the cell type of the third cell;
- the cell type associated with the second cell is the same as the cell type of the third cell and the cell type of the first cell is of a different cell type than the cell type of the second and third cells;
- the second and third cells are controlled by a same base station controller which is different than the base station controller controlling the first cell;
- an amount of data exchanged by the first base station with the user equipment is greater than a second threshold; or
- an amount of data exchanged per second by the first base station with the user equipment is greater than a third threshold.

5. The method of claim 1, wherein the one or more indications further indicate one or more of the following:
- the duration;
- a cell identity associated with the second cell;
- a cell type associated with the first cell; or
- a cell type associated with the second cell.

6. The method of claim 1, wherein sending further comprises sending the message to the other entity only if a subsequent inbound handover procedure for the user equipment to the first cell does not occur within a threshold time following an outbound handover procedure to the second cell.

7. The method of claim 1, wherein the other entity comprises at least one of a third base station from which the user equipment is handed into the first cell, a base station controller controlling the third base station, a centralized self-optimizing network server, or an operations, administration, and maintenance server.

8. An apparatus comprising:
- one or more processors; and
- one or more memories including computer program code, the one or more memories and the computer program code configured, with the one or more processors, to cause the apparatus to perform at least the following:
- sending a message from a first base station to another entity in a radio network, wherein the message comprises one or more indications that one or more conditions have been met, and wherein the one or more conditions comprise both of the following:
  - a duration the user equipment is connected to a first cell served by the first base station, prior to handover from the first cell to a second cell served by a second base station, is less than a threshold; and
  - the signal strength of the second cell as measured by the user equipment and reported to the first base station is better than a signal strength of the first cell for a threshold duration of time,
- wherein the user equipment is handed into the first base station from a third base station serving a third cell, and wherein the one or more memories and the computer program code are further configured, with the one or more processors, to cause the apparatus to perform at least the following:
- receiving, by the first base station, at least one configuration parameter forming at least part of the one or more conditions and indications of the one or more conditions from one of the third base station, a base station controller associated with the first base station, a centralized self-optimizing network server, or an operations, administration, and maintenance server.

9. The apparatus of claim 8, wherein the sending further comprises sending the message if the one or more conditions have been met.

10. The apparatus of claim 8, wherein the user equipment is handed into the first base station from a third base station.

11. The apparatus of claim 8, wherein the user equipment is handed into the first base station from a third base station serving a third cell, and wherein the one or more conditions further comprise one or more of the following:
- a velocity of the user equipment is less than a threshold velocity;
- the second cell is a neighbor of the third cell;
- the second cell is in an outbound handover list;
- the third cell is in an inbound handover list;
- a cell type associated with the second cell;
- a cell type associated with the first cell;
- a cell type associated with the second cell is a same as the cell type of the third cell;
- the cell type associated with the second cell is the same as the cell type of the third cell and the cell type of the first cell is of a different cell type than the cell type of the second and third cells;
- the second and third cells are controlled by a same base station controller which is different than the base station controller controlling the first cell;
- an amount of data exchanged by the first base station with the user equipment is greater than a second threshold; or
- an amount of data exchanged per second by the first base station with the user equipment is greater than a third threshold.

12. The apparatus of claim 8, wherein the one or more indications further indicate one or more of the following:
- the duration;
- a cell identity associated with the second cell;
- a cell type associated with the first cell; or
- a cell type associated with the second cell.

13. The apparatus of claim 8, wherein the sending further comprises sending the message to the other entity only if a subsequent inbound handover procedure for the user equipment to the first cell does not occur within a threshold time following an outbound handover procedure to the second cell.

14. The apparatus of claim 8, wherein the other entity comprises at least one of a third base station from which the user equipment is handed into the first cell, a base station controller controlling the third base station, a centralized self-optimizing network server, or an operations, administration, and maintenance server.

15. A computer program product comprising a non-transitory computer-readable storage medium bearing computer program code embodied therein for use with a computer, the computer program code comprising:
- sending a message from a first base station to another entity in a radio network, wherein the message comprises one or more indications that one or more conditions have been met, and wherein the one or more conditions comprise both of the following:
  - a duration the user equipment is connected to a first cell served by the first base station, prior to handover from the first cell to a second cell served by a second base station, is less than a threshold; and
  - the signal strength of the second cell as measured by the user equipment and reported to the first base station is better than a signal strength of the first cell for a threshold duration of time, wherein the user equipment is handed into the first base station from a third base station serving a third cell, and wherein the method further comprises receiving, by the first base station, at least one configuration parameter forming at least part of the one or more conditions and indications of the one or more conditions from one of the third base station, a base station controller associated with the first base station, a centralized self-optimizing network server, or an operations, administration, and maintenance server.

16. A method comprising:

receiving a message from a first base station, wherein the message comprises one or more indications that one or more conditions have been met, and wherein the one or more conditions comprise both of the following:

a duration the user equipment is connected to a first cell served by the first base station, prior to handover from the first cell to a second cell served by a second base station, is less than a threshold; and the signal strength of the second cell as measured by the user equipment and reported to the first base station is better than a signal strength of the first cell for a threshold duration of time;

wherein the receiving occurs in an entity other than the first or second base stations in the radio network, wherein the user equipment is handed into the first base station from the third base station serving a third cell, and wherein the method further comprises sending to the first base station at least one configuration parameter forming at least part of the one or more conditions and indications of the one or more conditions from the third base station, and wherein the entity comprises at least one of a third base station from which the user equipment is handed into the first cell, a base station controller controlling the third base station, a centralized self-optimizing network server, or an operations, administration, and maintenance server.

17. The method of claim 16, wherein the entity comprises a third base station, and wherein the user equipment is handed into the first base station from the third base station.

18. The method of claim 16, wherein the entity comprises a third base station, wherein the user equipment is handed into the first base station from the third base station serving a third cell, and wherein the one or more conditions further comprises one or more of the following:

a velocity of the user equipment is less than a threshold velocity;
the second cell is a neighbor of the third cell;
the second cell is in an outbound handover list;
the third cell is in an inbound handover list;
a cell type associated with the second cell;
a cell type associated with the first cell;
a cell type associated with the second cell is a same as the cell type of the third cell;
the cell type associated with the second cell is the same as the cell type of the third cell and the cell type of the first cell is of a different cell type than the cell type of the second and third cells;
the second and third cells are controlled by a same base station controller which is different than the base station controller controlling the first cell;
an amount of data exchanged by the first base station with the user equipment is greater than a second threshold; or an amount of data exchanged per second by the first base station with the user equipment is greater than a third threshold.

19. The method of claim 16, wherein the one or more indications further indicate one or more of the following:
the duration;
a cell identity associated with the second cell;
a cell type associated with the first cell; or
a cell type associated with the second cell.

20. An apparatus comprising:
one or more processors; and
one or more memories including computer program code, the one or more memories and the computer program code configured, with the one or more processors, to cause the apparatus to perform at least the following:

receiving a message from a first base station, wherein the message comprises one or more indications that one or more conditions have been met, and wherein the one or more conditions comprise both of the following:

a duration the user equipment is connected to a first cell served by the first base station, prior to handover from the first cell to a second cell served by a second base station, is less than a threshold; and the signal strength of the second cell as measured by the user equipment and reported to the first base station is better than a signal strength of the first cell for a threshold duration of time;

wherein the apparatus is part of an entity other than the first or second base stations in the radio network, wherein the user equipment is handed into the first base station from the third base station serving a third cell, and wherein the one or more memories and the computer program code are further configured, with the one or more processors, to cause the apparatus to perform at least the following:

sending to the first base station at least one configuration parameter forming at least part of the one or more conditions and indications of the one or more conditions from the third base station, and wherein the entity comprises at least one of a third base station from which the user equipment is handed into the first cell, a base station controller controlling the third base station, a centralized self-optimizing network server, or an operations, administration, and maintenance server.

21. The apparatus of claim 20, wherein the entity comprises a third base station, and wherein the user equipment is handed into the first base station from the third base station.

22. The apparatus of claim 20, wherein the entity comprises a third base station, wherein the user equipment is handed into the first base station from the third base station serving a third cell, and wherein the one or more conditions further comprise one or more of the following:

a velocity of the user equipment is less than a threshold velocity;
the second cell is a neighbor of the third cell;
the second cell is in an outbound handover list;
the third cell is in an inbound handover list;
a cell type associated with the second cell;
a cell type associated with the first cell;
a cell type associated with the second cell is a same as the cell type of the third cell;
the cell type associated with the second cell is the same as the cell type of the third cell and the cell type of the first cell is of a different cell type than the cell type of the second and third cells;

the second and third cells are controlled by a same base station controller which is different than the base station controller controlling the first cell;

an amount of data exchanged by the first base station with the user equipment is greater than a second threshold; or an amount of data exchanged per second by the first base station with the user equipment is greater than a third threshold.

23. The apparatus of claim 20, wherein the one or more indications further indicate one or more of the following:
the duration;
a cell identity associated with the second cell;
a cell type associated with the first cell; or
a cell type associated with the second cell.

24. A computer program product comprising a non-transitory computer-readable storage medium bearing computer program code embodied therein for use with a computer, the computer program code comprising:
receiving a message from a first base station, wherein the message comprises one or more indications that one or more conditions have been met, and wherein the one or more conditions comprise both of the following:
a duration the user equipment is connected to a first cell served by the first base station, prior to handover from the first cell to a second cell served by a second base station, is less than a threshold; and
the signal strength of the second cell as measured by the user equipment and reported to the first base station is better than a signal strength of the first cell for a threshold duration of time;

wherein the receiving occurs in an entity other than the first or second base stations in the radio network, wherein the user equipment is handed into the first base station from the third base station serving a third cell, and wherein the method further comprises sending to the first base station at least one configuration parameter forming at least part of the one or more conditions and indications of the one or more conditions from the third base station, and wherein the entity comprises at least one of a third base station from which the user equipment is handed into the first cell, a base station controller controlling the third base station, a centralized self-optimizing network server, or an operations, administration, and maintenance server.

\* \* \* \* \*